United States Patent [19]
Maier

[11] 3,854,511
[45] Dec. 17, 1974

[54] BLADE HOLDER FOR STEEL STRIP BLADES

[75] Inventor: Gerhard Maier, Brackwede, Germany

[73] Assignee: Maschinenfabrik B. Maier KG, Brackwede, Germany

[22] Filed: Apr. 12, 1973

[21] Appl. No.: 350,491

[30] Foreign Application Priority Data
Apr. 24, 1972   Germany............................ 2220003

[52] U.S. Cl. .............................. 144/230, 29/105 R
[51] Int. Cl. ......................... B27g 13/00, B26d 1/12
[58] Field of Search .......... 29/105, 105 A; 144/218, 144/230

[56] References Cited
UNITED STATES PATENTS

| | | | |
|---|---|---|---|
| 2,598,933 | 6/1952 | Nevin................................. | 144/230 |
| 2,664,617 | 1/1954 | Kralowetz.......................... | 29/105 R |
| 3,121,939 | 2/1964 | Williams............................ | 29/105 A |
| 3,134,412 | 5/1964 | Schmitt.............................. | 144/230 |
| 3,280,865 | 10/1966 | Alexander......................... | 144/218 |
| 3,542,302 | 11/1970 | Salzmann, Jr.................... | 144/218 X |
| 3,588,976 | 6/1971 | Dupuis et al..................... | 144/218 X |

Primary Examiner—Harrison L. Hinson
Attorney, Agent, or Firm—Bacon & Thomas

[57] ABSTRACT

The invention provides an adjustable holder for strip steel blade, the holder being fixable in a wood chipping machine cutter head. The blade fits over pins in one of a pair of clamping jaws (or in a shim carried by one of said jaws) and this jaw is adjustable towards or away from the cutting edge of the blade so as to adjust this edge to project beyond the holder to a required amount. The jaws are then clamped on to the blade by screws. The blade may be double-edged and reversible.

10 Claims, 2 Drawing Figures

PATENTED DEC 17 1974　3,854,511

BLADE HOLDER FOR STEEL STRIP BLADES

The present invention relates to a blade holder for steel strip blades which can be detachably secured in a cutter head of a wood chipping machine, the blade holder being provided with two clamping jaws adapted to be clamped together to hold an interchangeable steel strip blade.

In such blade holders location of a strip steel blade with two cutting edges without damage to the blade is difficult and the adjustment of a blade having one or two cutting edges is cumbersome, involving difficulty in securing adequate accuracy.

It is an object of the present invention to improve a blade holder of the kind referred to, so as to locate therein a steel strip blade having one or two cutting edges reliably and without damage, and to adjust the steel strip blade, simply, readily, rapidly and accurately.

The blade holder is made from a few individual parts yet enables the blade to be secured reliably therein.

A further object of the invention is an easy and accurate means for adjusting the steel strip blade with its effective cutting edge projecting to a desired extent.

According to the present invention there is provided a steel strip blade holder which is detachably locatable in a cutting head of a wood chipping machine, the holder having two clamping jaws adapted to be held together by connecting elements, between which jaws a steel strip blade is clamped and interchangeably retained, wherein the steel strip blade is detachably connected to a holding jaw or shim and in connection with at least one clamping jaw there are adjusting means acting on the jaw, to displace the jaw and the strip blade thereon so as to set the steel strip blade with its effective cutting edge projecting a required distance from the cutting head at right angles to the longitudinal direction of the cutting edge.

The invention will now be described with reference to the accompanying drawings, in which.

Figure 1:
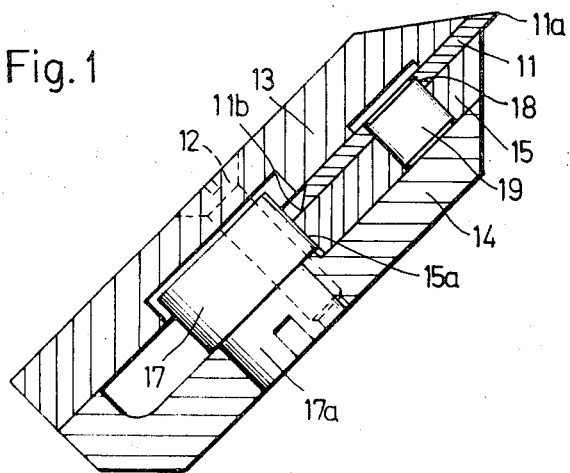
FIG. 1 is a cross-section through a blade holder for a steel strip blade.

A blade holder in accordance with the invention, detachably located in a cutting head 10 of a wood chipping machine, has a strip steel blade 11 which has at least one longitudinal cutting edge 11a and preferably another cutting edge 11b. The holder has clamping jaws 13 and 14 adapted to be clamped together by bolts, the steel strip blade 11 being clamped and interchangeably retained between the jaws.

Figure 2:
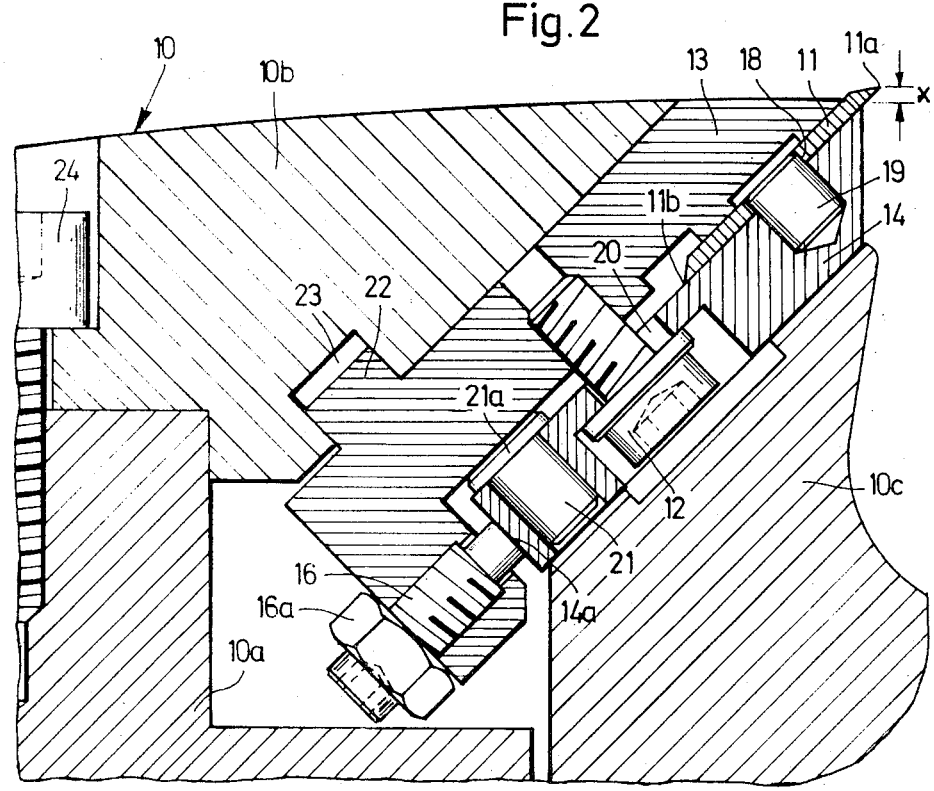
FIG. 2 is a cross-section of an alternative form of blade holder.

The steel strip blade 11 is positioned by an additional shim 15 (FIG. 1) or a clamping strip 14 (FIG. 2). In at least one clamping jaw 13 or 14 or in both, there are several adjusting means acting on the parts 15,14, displacing the retaining shim 15, 14 with the steel strip blade 11 projecting from the cutting head 10 its cutting edge 11a by an amount X at right angles to the longitudinal cutting edge direction. The said means include adjusting screws 16, eccentrics 17, wedges, or a combination of these adjusting means.

The steel strip blade is provided with several fixing holes 18 spaced relative to one another in the longitudinal direction of the blade, in which holes a locating pin 19 on the parts 14,15, passes.

The retaining means (shim 15 or clamping jaw 14 respectively) extend rearwards of the cutting edge of the blade to a distance greater than the width of the blade from front to back, and the rear edge of the retaining means is in contact with the adjusting means 17, 16.

In the blade holder of FIG. 1 the perforated steel strip blade 11 with its perforation 18 is fitted over the fixing pins 19 of the retaining shim 15 and the latter is held firmly clamped between the two clamping jaws 13 and 14 by means of screws 12 engaging in the jaws with slight clearance from the longitudinal edge 11b of the blade.

As adjusting means in this case there is an eccentric 17 which is rotatably located in the clamping jaw 14 about a pivot pin 17a.

The eccentric 17 may be provided on both sides with a pivot pin 17a so that it engages rotatably in both clamping jaws 13 and 14 and thereby fixes the relative positions of the two clamping ledges.

The eccentric surface of the eccentric 17 acts on the longitudinal edge 15a of the shim 15.

In the alternative blade holder of FIG. 2 one clamping jaw 14 is used as holding means, to which the perforated blade 11 is fixed with its perforation over the fixing pin 19 of the clamping jaw 14.

Connecting screws 12 extending at right angles to the longitudinal direction of the blade, pass through elongated holes 20 in the clamping jaw 13 and retain the blade 11 firmly clamped between the two jaws. There are adjusting screws 16 which press against the longitudinal edge 14a of the clamping jaw 14. These screws extend with their longitudinal direction parallel to the blade plane and at right angles to the longitudinal direction of the blade and are mounted in the clamping jaw 13.

These adjusting screws 16 may be fixed in an adjusted position by means of a lock nut 16a.

In the edge region of the clamping jaw 14 remote from the blade 11 and forming the abutting surface 14a for the adjusting means there are spacers keeping the distance between the two clamping jaws 13 and 14 equal to or slightly longer than the blade thickness these spacers being bolts 21 with collars 21a, so that when the screws 12 are tightened, the two clamping jaws 13 and 14 clamp the blade sides between substantially parallel surfaces.

The elongated hole 20 for each connecting screw 12 permits the clamping jaw 14 with blade 11 to be displaced relative the clamping jaw 13 at right angles to the longitudinal direction of the jaw, to adjust the length of projection ($x$) of the blade.

Clamping jaw 13 is provided with a rectangular projection 22, which engages in a suitable recess 23 of the cutting head to locate the jaw in the cutting head 10. The cutting head has a base 10a to which a curved-surface retaining part 10b is secured by screws 24. A further part 10c is held radially outwards by centrifugal force and the blade holder is detachably located between the holding part 10b and the centrifugal part 10c.

The cutting head 10 is provided with a plurality of blade holders around its circumference.

Each blade holder receives a blade 11 sharpened on one or both edges and enables the adjustment of the cutting edge 11a so that it projects to a distance beyond the surface of the cutting head 10.

When inserting a steel strip blade 11 in the holder the connecting screws 12 are slackened, the blade 11 with its perforation 18 fixed on the shim 15 or the clamping jaw 14 and the blade edge is located in position by the adjusting means 16, 17. Then the connecting screws are tightened and the blade 11 and consequently the jaw, clamped in position.

When the cutting edge 11a becomes blunted by use, the blade 11 is turned over so that its other cutting edge 11b becomes effective, whereafter the blade adjustment is effected as before by the adjusting means 16 and 17.

I claim:

1. A steel strip blade holder which is detachably locatable in a cutting head of a wood chipping machine, said holder comprising two clamping jaws, connecting elements for clamping said jaws together and a steel strip blade clamped and interchangeably retained between said jaws, said steel strip blade being detachably connected to a holding means in fixed relation thereto; and adjusting means acting on said holding means to displace said holding means and said strip blade relative to at least one of said jaws so as to set said steel strip blade with its effective cutting edge projecting a required distance from said one jaw at right angles to the longitudinal direction of said cutting edge.

2. A blade holder as recited in claim 1, wherein said adjusting means includes adjusting screws acting on the other of said jaws.

3. A blade holder as recited in claim 1, wherein said steel strip blade has locating holes spaced apart in the longitudinal direction of said blade; and projections on said holding means engaging in said holes.

4. A blade holder as recited in claim 1, wherein said holding means projects with clearance beyond the edge of said steel strip blade opposite said cutting edge, and there forms an abutment surface co-operating with said adjusting means.

5. A blade holder as recited in claim 1, wherein said adjusting means include a pivotal eccentric rotatably mounted on at least one jaw.

6. A blade holder as recited in claim 5, wherein the eccentric includes two coaxial pivot mounting pins engaging respective jaws, both pivot pins simultaneously forming a setting means fixing said two clamping jaws in their positions relative to each other.

7. A blade holder as recited in claim 1, wherein said holding means comprises a shim, said shim being movably positioned between said clamping jaws.

8. A blade holder as recited in claim 2, wherein said screws forming part of said adjusting means threadedly engage in said one jaw with their longitudinal direction parallel to the plane of said steel strip blade, and at right angles to the longitudinal direction of said blade, and a lock nut for each screw.

9. A blade holder as recited in claim 8, wherein the other clamping jaw comprises said holding means and is provided with blade fixing pins and in its longitudinal region remote from the blade edge in use, is provided with an abutment surface for said adjusting means and with interchangeable spacers adjusting the spacing between said two clamping jaws in said remote region to that of the thickness of said steel strip blade.

10. A blade holder as recited in claim 9, wherein at least one clamping jaw is provided with positive locating means for locating said blade holder in a cutting head.

* * * * *